United States Patent
Tolfa et al.

(10) Patent No.: US 6,267,907 B1
(45) Date of Patent: Jul. 31, 2001

(54) LUBRICANT COMPOSITION COMPRISING AN ALIPHATIC SUBSTITUTED NAPHTHALENE ALONE OR IN COMBINATION REFRIGERATION SYSTEMS

(75) Inventors: John C. Tolfa, Midland; Thomas E. Rajewski, Bay City, both of MI (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/325,136

(22) Filed: Jun. 3, 1999

(51) Int. Cl.⁷ .................................................. C09K 5/04
(52) U.S. Cl. ............................... 252/68; 508/579
(58) Field of Search ................. 252/68; 508/579

(56) References Cited

U.S. PATENT DOCUMENTS

| | | |
|---|---|---|
| 1,417,047 * | 5/1922 | Eppley . |
| 3,129,185 * | 4/1964 | Rizzuti et al. . |
| 4,111,821 | 9/1978 | Lazarus et al. ............... 252/49.9 |
| 4,238,343 | 12/1980 | Pellegrini, Jr. et al. ............ 585/24 |
| 4,420,946 | 12/1983 | Rojey et al. ..................... 62/101 |
| 4,737,297 | 4/1988 | Yoshida et al. ..................... 252/9 |
| 4,963,280 | 10/1990 | Wilkins et al. .................... 252/58 |
| 4,983,313 | 1/1991 | Kaneko et al. .................... 252/68 |
| 5,279,752 | 1/1994 | Hasegawa et al. ................ 252/68 |
| 5,344,582 | 9/1994 | Umemoto et al. ................... 252/9 |
| 5,512,198 | 4/1996 | Sasaki et al. ..................... 252/68 |
| 5,716,549 | 2/1998 | Nimitz et al. ..................... 252/364 |
| 5,783,528 | 7/1998 | Rodenberg ........................ 508/200 |
| 5,817,251 | 10/1998 | Takigawa et al. .................. 252/68 |
| 5,847,246 | 12/1998 | Hsu et al. ........................ 585/1 |
| 5,858,930 | 1/1999 | Desai et al. ...................... 508/261 |

FOREIGN PATENT DOCUMENTS 2306497    5/1997    (GB) .

OTHER PUBLICATIONS

U. Hesse and H.O. Spauschus, *Refrigeration Science and Technology*, Fr, Paris, (Sep. 3, 1996) 605–608, "Lubricants for Carbon Dioxide".

"Lubricants for use with Carbon Dioxide Refrigerants" Jorg Fahl, Ki Luft–and Kaltechnik, p 375–379, 1998.*

Bock, Lubricating Oils for use in Mobile Refrigerants, DKV–Tagungsber (1998) 25rh (3) 179–193.*

* cited by examiner

*Primary Examiner*—Margaret Einsmann
(74) *Attorney, Agent, or Firm*—Samuel B. Laferty; David M. Shold

(57) ABSTRACT

A lubricant-refrigerant composition for a compression refrigeration system is disclosed which comprises (A) carbon dioxide refrigerant, and (B) a lubricant of an aliphatic naphthalene. A supplemental lubricant comprising at least one alkyl benzene, a hydrocarbon, a polyalkylene glycol, a polyol ester or a polyvinyl ether may also be present. Additionally, a performance additive comprising an alkoxylated alcohol or phenol, an alkoxylated glycol, an alkyl phenol or a phosphorus compound may also be present.

50 Claims, 1 Drawing Sheet

LUBRICANT COMPOSITION COMPRISING AN ALIPHATIC SUBSTITUTED NAPHTHALENE ALONE OR IN COMBINATION REFRIGERATION SYSTEMS

FIELD OF THE INVENTION

This invention relates to a lubricating oil for a refrigeration system using carbon dioxide as the refrigerant and, in particular, to a lubricating oil wherein the oil comprises aliphatic substituted naphthalenes. The aliphatic substituted naphthalenes have excellent miscibility properties with carbon dioxide and further the aliphatic substituted naphthalenes do not interfere with heat transfer. Supplemental lubricants can also be employed as well as performance additives.

BACKGROUND OF THE INVENTION

Chlorofluorocarbons (CFCs) such as R-11, R-12, R-113, R-114, R-115 and blends containing these CFCs such as R-500 and R-502 are currently used as refrigerants. Because of the great chemical stability of CFCs, when they are released into the atmosphere only minuscule fractions are destroyed by natural processes in the troposphere. As a result, CFCs have long atmospheric lifetimes and migrate to the stratosphere where they undergo photolysis, forming chlorine radicals that seriously deplete the earth's protective ozone layer. When R-12 (dichlorodifluoromethane) is eventually released into the atmosphere, it rises to the stratosphere, where it is struck by ultraviolet radiation. This causes the R-12 to decompose to give chlorine radicals that catalytically destroy the protective ozone layer of the earth. This depletion of stratospheric ozone allows more ultraviolet light to reach the surface of the earth, resulting in increases in human skin cancer and cataracts plus damage to crops and natural ecosystems. This invention will significantly decrease these adverse effects by providing a lubricant suitable for use with an environmentally safe alternative agent, carbon dioxide, to use in place of the CFCs.

U.S. Pat. No. 4,111,821 (Lazarus et al., Sep. 5, 1978) discloses lubricant compositions for use in the cylinder and drive train lubrication of reciprocating compressors for oxygen-free gases comprise 97% to 99% by weight of a base fluid that is a phthalate ester of an aliphatic alcohol having 10 to 15 carbon atoms and 1% to 3% by weight of an additive system that contains a viscosity index modifying component, an antioxidant component, and optionally a corrosion inhibitor and/or a load bearing additive.

U.S. Pat. No. 4,238,343 (Pellegrini, Jr., Dec. 9, 1980) relates to synthetic oils useful for the insulation of electrical apparatus and more particularly it relates to the preparation and use in electrical power transformers of novel mono- and dialkylates of an aromatic compound in which the alkylate portion is an oligomer of a four to 12 carbon alpha-olefin containing predominantly at least about 30 carbon atoms up to about 60 carbon atoms.

U.S. Pat. No. 4,420,946 (Rojey et al., Dec. 20, 1983) relates to refrigeration machines using the vaporization of a refrigeration fluid to produce cold. In conventional 1-stage installations, the refrigeration fluid in vapor phase is compressed, condensed with heat delivery to an external fluid, most often water or air, and then expanded and supplied to the vaporization step.

U.S. Pat. No. 4,737,297 (Yoshida et al., Apr. 12, 1988) consists of, or comprises as the main component, at least one monosubstituted naphthalene derivative represented by the following general formula

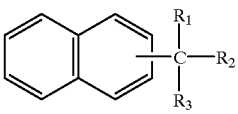

wherein $R_1$, $R_2$ and $R_3$ may be identical with, or different from, each other and are each an alkyl, phenyl or alkylphenyl group having 1 to 21 carbon atoms with the proviso that the total of carbon atoms of $R_1$, $R_2$ and $R_3$ is 4–23.

U.S. Pat. No. 4,963,280 (Wilkens et al., Oct. 16, 1990) relates to the improvement in the energy efficiency of heat pump systems including refrigeration units, heating and air conditioning systems which pump heat from one location to another.

Typical heat pump systems rely upon a compressible fluid to transfer the heat from one location to another. The most common heat transfer media are the members of the Freon family as well as ammonia. Ammonia finds particular application in large scale refrigeration systems such as cold storage units and the like. In addition to these two classes of heat transfer media or compressible fluids, other compressible fluids may be utilized which undergo phase changes under reasonable changes of pressure. Such compressible fluids which undergo the necessary change from liquid to gaseous states by the change in pressure are well known in the art and include gases such as carbon dioxide. In general, the selection of the heat transfer media is dependent upon a number of design criteria which are well known. In general, for commercial installations the use of either Freon or ammonia is most preferred. However in specially applications media such as carbon dioxide may be utilized.

U.S. Pat. No. 4,983,313 (Kaneko et al., Jan. 8, 1991) discloses a refrigerating machine oil composition comprising:

(A) 85 to 30% by weight of alkyl benzene having a kinematic viscosity at 40° C. of 30 cSt or more;
(B) 5 to 70% by weight of a paraffin-based mineral oil having a kinematic viscosity at 40° C. of 20 to 500 cSt, a pour point of –35° C. or lower, a viscosity index of 60 or more, and a sulfur content of 100 ppm or less; and
(C) 1 to 30% by weight of a naphthene-based mineral oil having a kinematic viscosity at 40° C. of 5 to 500 cSt, a pour point of –30° C. or lower, and a sulfur content of 0.05 to 1% by weight, the total sulfur content of said composition being 0.01 to 0.10% by weight.

The present composition is excellent in stability, lubricity, compatibility with refrigerants, and low temperature property.

U.S. Pat. No. 5,279,752 (Hasegawa et al., Jan. 18, 1994) of the present invention relates to compositions useful as lubricating oil for refrigerants.

As the refrigerants for the refrigerating machines having a type of compressing the vapor of the refrigerant, there are widely used halogenated hydrocarbons typified by trichloromonofluoromethane (CFC-11), dichlorodifluoromethane (CFC-12), monochlorodifluoromethane (HCFC-22), trichlorotrifluoroethane (CFC-113) or the like, hydrocarbons, in which propane is a typical substance, and inorganic gases typified by ammonia, carbon dioxide or the like.

As lubricating oils for the refrigerating machines using such refrigerants, there are generally used paraffinic mineral oils, naphthenic mineral oils, alkylbenzenes, poly-α-olefins, oils consisting of polyoxyalkylene and/or polyalkylene glycol compounds and a mixture of two or more of these oils, or oils obtained by adding one or more additives to these base oils.

U.S. Pat. No. 5,344,582 (Umemoto et al., Sep. 6, 1994) relates to a traction fluid lubricant is disclosed which contains a naphthenic ingredient having a weight average molecular weight of 200–300 and obtained by hydrogenating oligomers of cyclopentadiene having a ratio of the number of norbornenic double bond to that of cyclopentenic double bond of smaller than 0.9 but not smaller than 0.1. The naphthenic ingredient is suitably used in conjunction with an auxiliary ingredient selected from a polybutene having a viscosity of 5–60 cSt at 40° C. and a bicyclohexyl compound.

U.S. Pat. No. 5,512,198 (Sasaki et al., Apr. 30, 1996) relates to when a fluoroalkane is used as a refrigerant and an ester oil, polyalkylene glycol oil or the like is used as a refrigerator oil. As a result, it has been found that a refrigerator oil composition capable of exhibiting excellent abrasion resistance and therefore practically usable can be obtained by incorporating a boron compound in the refrigerator oil.

The reference therefore provides a refrigerator oil composition for a fluoroalkane refrigerant which comprises a base oil composed principally of an oxygen-containing compound and 0.005–5.0 wt. %, based on the total weight of the composition, of a boron compound as an essential component.

U.S. Pat. No. 5,716,549 (Nimitz et al., Feb. 10, 1998) relates to a new set of effective, environmentally safe, nonflammable, low-toxicity refrigerants, solvents, foam blowing agents, propellants, and firefighting agents is disclosed. The agents are clean, electrically nonconductive, and have short atmospheric lifetimes, zero ozone-depletion potential, and low global warming potentials. The agents comprise at least one fluoroiodocarbon agent satisfying the general formula $C_aH_bBr_cCl_dF_eI_fN_gO_h$, wherein a is between and including 1 and 8; b is between and including 0 and 2; c, d, g, and h are each between and including 0 and 1; e is between and including 1 and 18; and f is between and including 1 and 2, either neat or mixed with additives selected from the group consisting of: alcohols, esters, ethers, fluoroethers, hydrocarbons, hydrofluorocarbons, and perfluorocarbons.

U.S. Pat. No. 5,817,251 (Takigawa et al., Oct. 6, 1998) relates to a refrigerating machine oil (a refrigerating machine lubricating oil), a fluid composition for use in a refrigerating machine, a refrigerating machine using therein a hydrofluorocarbon refrigerant with said refrigerator oil and a method of lubricating a cooling system. More particularly, this invention relates to a refrigerating machine oil which comprises as least one hydrocarbon compound having a specific structure and is suitable for use with a hydrofluorocarbon (HFC) refrigerant, to a fluid composition for use in a refrigerating machine, which comprises the hydrofluorocarbon refrigerant and the refrigerating machine oil, to a refrigerating machine using therein the above-mentioned fluid composition and to a method of lubricating a cooling system of a refrigerating machine using therein the hydrofluorocarbon (HFC) as a refrigerant, characterized by using the refrigerator oil as a lubricating oil in said cooling system.

U.S. Pat. No. 5,847,246 (Hsu et al., Dec. 8, 1998) relates to heat transfer processes at low temperatures, to low temperature heat transfer fluids, and more particularly, to processes for the transfer of thermal energy at temperatures significantly below zero Fahrenheit by means of a specially formulated low temperature heat transfer fluid.

The heat transfer fluid of this reference is comprised of a mixture selected from a group of mixtures containing at least two monocyclic terpenes, at least two bicyclic terpenes, or at least one monocyclic terpene and at least one bicyclic terpene. Regardless of the selection, the respective components (monocyclic or bicyclic terpenes) are provided in an effective amount to retain the liquid phase of the mixture comprising the heat transfer fluid at a temperature in the range from about 0° F. to between about –110° F. and –165° F.

U.S. Pat. No. 5,858,930 (Dasai et al., Jan. 12, 1999) provides compounds of formula (I):

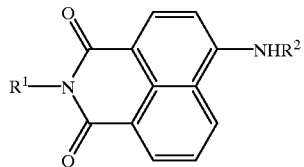

wherein $R^1$ and $R^2$ are each independently selected from branched alkyl groups containing 7 to 8 carbon atoms and alkyloxylalkyl groups containing 4 to 24 carbon atoms.

In accordance with this reference, by selection of the substituents $R^1$ and $R^2$ of the 1,8-naphthalimide ring structure, a dye can be obtained that has excellent stability in lubricant compositions under a refrigeration cycle environment while simultaneously providing sufficient fluorescent efficiency. $R^1$ and $R^2$ are "independently selected," meaning that they may be the same or different. The substituent groups represented by $R^1$ and $R^2$ are a branched alkyl group containing 7 or 8 carbon atoms or an alkyloxyalkyl group containing 4 to 24 carbon atoms. The branched alkyl groups include single and multiple branching.

SUMMARY OF THE INVENTION

A lubricant-refrigerant composition for a compression refrigeration system is disclosed which comprises (A) carbon dioxide refrigerant, and (B) a lubricant of an aliphatic substituted naphthalene. A supplemental lubricant may also be present. The supplemental lubricant comprises at least one alkyl benzene, a hydrocarbon, a polyalkylene glycol, a polyol ester or a polyvinyl ether. Additionally, a performance additive comprising an alkoxylated alcohol or phenol, an alkoxylated glycol, an alkyl phenol or a phosphorus compound may also be present.

DETAILED DESCRIPTION OF THE INVENTION

Compressors and the Refrigeration Cycle

Figure 1:
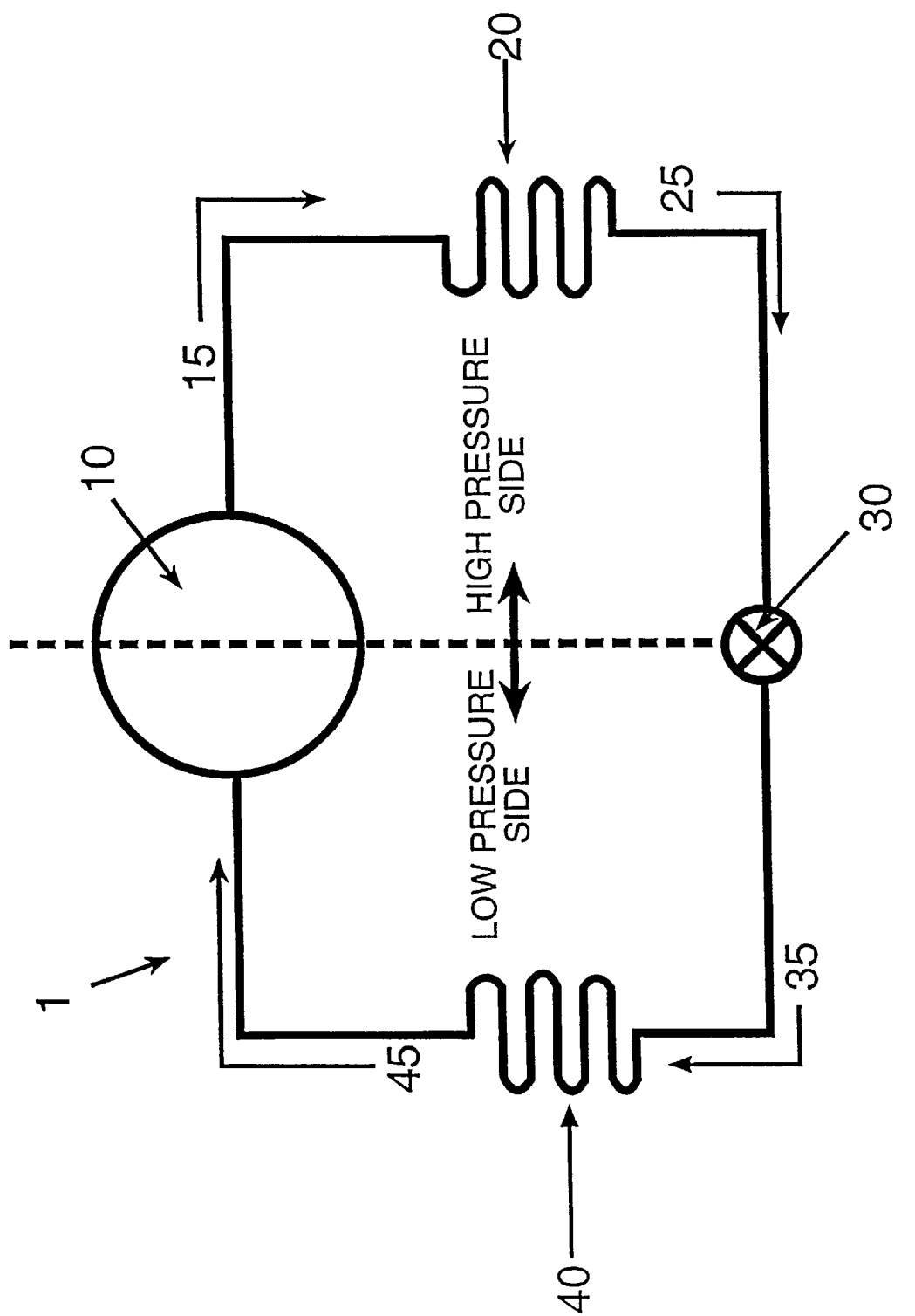
FIG. 1 is a schematic diagram of the basic mechanical compression refrigeration cycle.

Compressors are machines that draw in a gas and deliver the gas at a higher pressure and temperature than at intake. The higher pressure of the gas is generally used to do useful work. Compressors are normally driven by an electric motor, steam turbine or internal combustion engine and come in a variety of types and sizes, depending on the application need. Refrigeration and air conditioning can be considered as compressor applications which require special consideration, because some lubricant circulates with the refrigerant in such systems. Therefore, the refrigerant and lubricant must be compatible.

Refrigeration compressors are classified as either positive displacement or dynamic compressors. Positive displacement compressors increase the pressure of a refrigerant gas by decreasing the volume of the gas. Examples include reciprocation (single and double acting), sliding vane rotary screw and scroll compressors.

Dynamic compressors such as multistage centrifugal compressors are used in large air conditioning facilities. In these compressors, the refrigerant is channeled through the machine which is designed to impart velocity to the refrigerant and then convert the velocity (kinetic energy) into pressure by moving the gas through diffusers.

Both positive displacement and dynamic compressors are often found in hermetic or semi-hermetic type designs. All of the moving parts, including the electric motor, are sealed inside these types of refrigeration systems. This design is almost always found in the refrigeration system of refrigerator/freezers and centrifugal chillers. Thus, lubricants for this type of service should be compatible with the system elastomers and other varnish materials found in electric motors. They also should have a high dielectric strength (25 kilovolts minimum).

Since carbon dioxide is a constituent of the atmosphere, it is obtained from atmospheric air by fractionation and, thus, has no additional impact on global warming, but for the energy consumption associated with the fractionation process. Carbon dioxide possesses a high specific heat, a high volumetric heat capacity and, in general, excellent thermodynamics and transport properties—all desirable characteristics of a refrigerant.

Compression refrigeration systems are widely used in both domestic and industrial applications. The primary components of this cycle are shown in FIG. 1.

FIG. 1 schematically illustrates a refrigeration system of a vapor compression type, which is constructed by a compressor 10, a condenser 20, a pressure control valve (expansion valve) 30, and a heat absorber (evaporator) 40 such that a closed circuit for a refrigerant (as carbon dioxide) is constructed.

Within this invention carbon dioxide is operating in a transcritical state. As such, the carbon dioxide exists in a liquid-like state in that both a liquid and a gas co-exist, with the liquid being the larger amount; and in a gas-like state in that both a gas and a liquid co-exist, with the gas being the larger amount.

The compressor 10 compresses the incoming low-pressure carbon dioxide refrigerant in the gas-like state 45 from the evaporator 40 and discharges the carbon dioxide refrigerant in the gas-like state at a higher pressure and temperature 15. The discharged gas 15 from the compressor 10 passes through the condenser (gas cooler) 20. Here the latent heat of vaporization is removed from the carbon dioxide refrigerant in the gas-like state 15, condensing it into a high pressure refrigerant in the liquid-like state 25. The liquid-like carbon dioxide refrigerant 25 passes through the expansion valve 30, which reduces the pressure on the liquid 35 and therefore its boiling point. As the low pressure liquid-like carbon dioxide 35 passes through the evaporator, or cooling unit 40, it absorbs heat from the surroundings and vaporizes, producing a cooling effect. The low-pressure carbon dioxide in the gas-like state 45 flows from the evaporator 40 and is ready for another cycle to begin.

Two things are interesting to note about the refrigeration cycle. First, since the lubricant travels with the refrigerant, the low temperature and miscibility properties of the lubricant are critical to the performance of the refrigeration system. Second, the heat removed from the refrigerant in the condenser is equal to the amount of heat removed from the evaporator plus the heat resulting from the mechanical work done by the compressor. (Therefore, on a hot summer day, if one opens the refrigerator door to cool off the room, the net result will be a warming of the room!)

(A) Carbon Dioxide Refrigerant

Carbon dioxide is a known expendable refrigerant in that carbon dioxide is used to cool a substance or evaporator and the carbon dioxide refrigerant is then released into the atmosphere. It is not collected and recondensed, it is used only once. A system using an expendable refrigerant, such as carbon dioxide, is sometimes referred to as chemical refrigeration or open cycle refrigeration. Refrigerants of this type have a low boiling temperature. Carbon dioxide (R-744) has a boiling temperature at atmospheric pressure of −78° C. either in the solid or liquid state. In the context of this invention, carbon dioxide is recycled; that is, it remains within a closed system where it is collected and recondensed. It is not expended or exhausted.

(B) The Lubricant of an Aliphatic Substituted Naphthalene

The aliphatic substituent naphthalene lubricant is of the formula

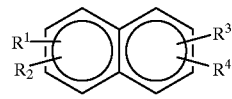

wherein $R^1$, $R^2$, $R^3$ and $R^4$ are the same or different from each other and are each a hydrogen atom or an aliphatic group having from 1 to 20 carbon atoms, with the proviso that the total number of carbon atoms of $R^1$, $R^2$, $R^3$ and $R^4$ is within the range of 6 to 60, preferably from 15 to 50. Preferably the total number of carbon atoms of $R^1$, $R^2$, $R^3$ and $R^4$ is not more than 40 and most preferably not more than 30.

Preferable aliphatic groups represented by $R^1$, $R^2$, $R^3$ and $R^4$ include alkyl and alkenyl groups. Alkyl groups containing 1 to 20 carbon atoms are methyl, ethyl, the isomers of propyl, the isomers of butyl, the isomers of pentyl, the isomers of hexyl, the isomers of octyl, the isomers of nonyl, the isomers of decyl, the isomers of undecyl, the isomers of dodecyl, the isomers of tridecyl, the isomers of tetradecyl, the isomers of pentadecyl, the isomers of hexadecyl, the isomers of heptadecyl, the isomers of octadecyl, the isomers of nonadecyl, and the isomers of eicosyl.

Alkenyl groups containing from 2 to 20 carbon atoms include vinyl, the isomers of propenyl, the isomers of butenyl, the isomers of pentenyl, the isomers of hexenyl, the isomers of heptenyl, the isomers of octenyl, the isomers of nonenyl, the isomers of decenyl, the isomers of undecenyl, the isomers of dodecenyl, the isomers of tridecnyl, the isomers of tetradecenyl, the isomers of pentadecenyl, the isomers of hexadecenyl, the isomers of heptadecenyl, the isomers of octadecenyl, the isomers of nonadecenyl and the isomers of eicosenyl.

Of the alkyl groups and alkenyl groups, preferred are the alkyl groups.

The total number of carbon atoms of $R^1$, $R^2$, $R^3$ and $R^4$ is in the range of 8 to 60. All of $R^1$, $R^2$, $R^3$ and $R^4$ may be an aliphatic group, or at least one of $R^1$, $R^2$, $R^3$ and $R^4$ may be an aliphatic group while the rest thereof may be a hydrogen atom. It is preferable that 1 to 3 of $R^1$, $R^2$, $R^3$ and $R^4$ are an aliphatic group while the rest thereof are hydrogen.

When two out of $R^1$, $R^2$, $R^3$ and $R^4$ are aliphatic groups, the combination of $R^1$, $R^2$, $R^3$ and $R^4$ may be arbitrarily selected. A couple of aliphatic groups may be attached to the same ring as in the case where $R^1$ and $R^2$ are respectively aliphatic groups. Alternatively, a single aliphatic group may be attached to each of the different rings as in the case where $R^1$ and $R^3$ are respectively aliphatic groups.

The aliphatic substituted naphthalene can be manufactured by any conventional method. For example, the aliphatic substituted naphthalenes can be obtained by attaching (or addition reacting) compounds selected from the group consisting of halides of alkyl groups having 1 to 20 carbon atoms and olefins having 2 to 20 carbon atoms to a naphthalene nucleus. A particularly preferred aliphatic substituted naphthalene is MCP-917 which is an alkyl naphthalene alkylated with a $C_{14}$ group, available from Mobil Chemical. The weight ratio of (A):(B) within the refrigeration system is from (60–90):(10–40), preferably from (60–85):(15–40) and most preferably from (70–85):(15–30).

Supplemental Lubricant

In addition to the aliphatic substituted naphthalene, a supplemental lubricant may also be employed. When a supplemental lubricant is employed, the weight ratio of the aliphatic substituted naphthalene to the supplemental lubricant is (1–99):(99–1) and preferably is (10–90):(90–10). The supplemental lubricant, when employed, comprises at least one of an alkyl benzene, a hydrocarbon, a polyalkylene glycol, a polyol ester or a polyvinyl ether.

The Alkyl Benzene

The alkyl groups of the alkyl benzene contain a total from 8 to 40 carbon atoms and preferably from 12 to 36 carbon atoms. The alkyl group may be straight chained or branch chained. Alkyl benzenes are prepared by well-known procedures, one of which is the Friedel-Crafts alkylation utilizing a Lewis acid.

The Hydrocarbon

Hydrocarbons are the major constituent of crude petroleum and are compounds that contain carbon and hydrogen only. The hydrocarbons are mineral base stocks that typically contain from 10 to 80 carbon atoms and preferably from 16–70 carbon atoms. These base stocks are sometimes characterized as paraffinic, naphthenic or aromatic depending upon the nature of the hydrocarbons present. Paraffinic base stocks contain long saturated hydrocarbon chains, naphthenic base stocks contain five or six membered saturated cyclic rings and aromatic base stocks contain unsaturated cyclic (aromatic) rings. The hydrocarbons most preferred as a supplemental lubricant in this invention are the paraffinic base stocks and naphthenic base stocks.

In reality, none of the above-mentioned base stocks is composed of a single structural type. Instead, they contain mixed structures with one or the other predominating. Paraffinic base stocks, for example, contain all three types of structures, but paraffinic structures are present in the largest amount.

Another hydrocarbon having utility in this invention is a synthetic base stock called polyalphaolefins (PAOs). Saturated olefin oligomers are a class of synthetic high performance lubricants that have been developed to meet the increasingly stringent demands being placed on today's lubricants. The term polyalphaolefin, or PAO, is commonly used to designate such lubricants. PAOs are hydrocarbons manufactured by the catalytic oligomerization of linear α-olefins having six or more carbon atoms.

PAOs are manufactured by a two-step reaction sequence from linear α-olefins, which are derived from ethylene. The first step is synthesis of a mixture of oligomers, which are polymers of relatively low molecular weight.

α-olefin→dimer+trimer+tetramer+pentamer, etc.

The second step in the process entails hydrogenation of the unsaturated oligomer. The hydrogenation may be carried out before or after distillation. Distillation is required to remove any unreacted monomer, to separate the dimer, and in some cases to co-produce a lighter and a heavier grade of PAO.

The Polyalkylene Glycol

The supplemental lubricant may also comprise a polyalkylene glycol, which is an ether of the structure

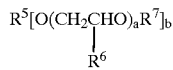

wherein $R^5$ is a hydrocarbon group containing from 1 to 30 carbon atoms or an alkyl substituted aromatic wherein the alkyl group contains from 1 to 20 carbon atoms, $R^6$ is independently hydrogen, methyl or ethyl, $R^7$ is hydrogen or a hydrocarbon group containing from 1 to 20 carbon atoms or an acyl group containing from 2 to 20 carbon atoms, b is an integer of from 1 to 10 and a is an integer such that the product of a and b is at least two. When $R^7$ is a hydrocarbon group, preferably either from 1 to 6 aliphatic carbon atoms and most preferably from 1 to 4 carbon atoms are present or from 8 to 10 aliphatic carbon atoms are present. When $R^7$ is an acyl group, preferably from 2 to 10 carbon atoms are present.

As defined earlier, the hydrocarbon group may be a substituted hydrocarbon group, that is, having a substituent which does not alter the predominantly hydrocarbon character of the group. For $R^5$ and $R^7$, these substituents include hydroxy and alkoxy. Depending upon how the $R^6$ and $R^7$ groups are selected, the polyalkylene glycol may be a polyglycol ether.

In representative examples of polyalkylene glycols that follow, the value of a within a given structure is shown to be the same. However, within the alkoxylation process, it is possible for a to vary. When 9 moles of ethylene oxide are reacted with 1 mole of trimethylolpropane, a statistical mixture of the a's on each chain may vary somewhat from 3. In the example of a polyalkylene glycol from trimethylolpropane, shown below, a is 3 on each of the three chains. It is possible though that in one chain that a be 2 or 4, while in the other chains that a be 5 or 6.

When $R^5$ is selected to contain three carbon atoms, $R^6$ and $R^7$ are selected to be hydrogen, a is 4 and b is 2, such that the starting alcohol is 1,2-propanediol, then the ether is represented as

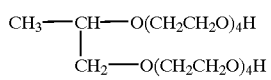

When $R^5$ is selected to contain three carbon atoms, $R^6$ and $R^7$ are selected to be hydrogen, a is 3 and b is 3, such that the starting alcohol is glycerol, then the ether is represented as

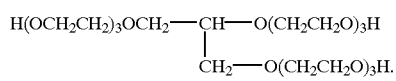

When $R^5$ contains two carbon atoms, $R^6$ and $R^7$ are hydrogen, a is 8 and b is 1, such that the starting alcohol is ethanol, the ether has the structure

When $R^5$ contains two carbon atoms, $R^6$ and $R^7$ are hydrogen, a is 5 and b is 2, such that the starting alcohol is ethylene glycol, the ether has the structure

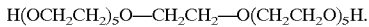

When $R^5$ contains six carbon atoms, $R^6$ and $R^7$ are hydrogen, a is 3 and b is 3, such that the starting alcohol is trimethylolpropane, the ether may be represented as

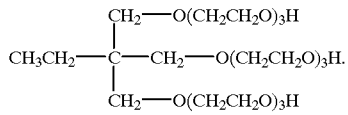

When $R^5$ contains five carbon atoms, $R^6$ and $R^7$ are hydrogen, a is 2 and b is 4, such that the starting alcohol is pentaerythritol, the ether may be represented as

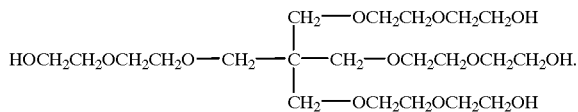

When $R^5$ contains one carbon atom, $R^6$ is methyl and $R^7$ is hydrogen, a is 9 and b is 1, such that the starting alcohol is methanol, the ether may be represented as

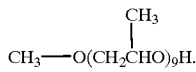

When $R^5$ contains one carbon atom, $R^6$ and $R^7$ are methyl, a is 9 and b is 1, such that the starting alcohol is methanol, the ether may be represented as

Within the polyalkylene glycol, $R^5$ preferably is an alcohol residue containing up to 30 carbon atoms and, most preferably, is an alcohol residue containing up to 6 carbon atoms. $R^5$ may be a residue of a mono alcohol. $R^5$ may be a phenol residue present as an alkyl substituted aromatic wherein the alkyl group contains from 1 to 12 carbon atoms. $R^5$ may also be a residue of a polyalcohol containing from 2 to 6 carbon atoms. Preferably, the polyalcohol is a diol and a preferred diol is ethylene glycol. Preferably, $R^6$ is hydrogen. or methyl and most preferably $R^6$ is a methyl group. Most preferably, $R^7$ is hydrogen. Preferably, a and b are independently at least 2 and most preferably are at least 4.

The Polyol Ester

The polyol ester is an organic ester which is the reaction product of a carboxylic acid and a polyhydroxy compound wherein the ester is characterized by the general formula $$R^8[OC(O)R^9]_m \tag{I}$$

wherein $R^8$ is a hydrocarbyl group, each $R^9$ is independently (i) hydrogen, (ii) a straight chain lower hydrocarbyl group, (iii) a branched chain hydrocarbyl group, or (iv) a mixture of one or both of (ii) and (iii) with a straight chain hydrocarbyl group containing from about 8 to 14 carbon atoms, and m is at least 2.

The carboxylic esters utilized as the polyol ester in the liquid refrigerant compositions of the present invention are reaction products of one or more carboxylic acids (or the lower esters thereof such as methyl, ethyl, etc.) with polyhydroxy compounds containing at least two hydroxy groups. The polyhydroxy compounds may be represented by the general formula $$R^8(OH)_m \tag{II}$$

wherein $R^8$ is a hydrocarbyl group and m is at least 2. The hydrocarbyl group may contain from 4 to about 20 or more carbon atoms, and the hydrocarbyl group may also contain one or more nitrogen and/or oxygen atoms. The polyhydroxy compounds generally will contain from about 2 to about 10 hydroxy groups and more preferably from about 2 to about 6 hydroxyl groups. The polyhydroxy compound may contain one or more oxyalkylene groups and, thus, the polyhydroxy compounds include compounds such as polyetherpolyols. The number of carbon atoms and number of hydroxy groups contained in the polyhydroxy compound used to form the carboxylic esters may vary over a wide range.

Specific examples of polyhydroxy compounds useful in the present invention include ethylene glycol, diethylene glycol, triethylene glycol, propylene glycol, dipropylene glycol, glycerol, neopentyl glycol, 1,2-, 1,3- and 1,4-butanediols, pentaerythritol, dipentaerythritol, tripentaerythritol, triglycerol, trimethylolpropane, sorbitol, hexaglycerol, 2,2,4-trimethyl-1,3-pentanediol, etc. Mixtures of any of the above polyhydroxy compounds can be utilized.

The carboxylic acids utilized in the preparation of the carboxylic esters useful in the liquid refrigerant compositions of the present invention may be characterized by the following general formula $$R^9COOH \tag{III}$$

wherein $R^9$ is (i) hydrogen, (ii) a straight chain lower hydrocarbyl group, (iii) a branched chain hydrocarbyl group, or (iv) a mixture of one or both of (ii) and (iii) with a straight chain hydrocarbyl group containing from about 8 to about 14 carbon atoms. Stated otherwise, at least one $R^9$ group in the ester of Formula I must contain a lower straight chain hydrocarbyl group or a branched chain hydrocarbyl group. The straight chain lower hydrocarbyl group ($R^9$) contains from 1 to about 7 carbon atoms, and in a preferred embodiment, contains from 1 to about 5 carbon atoms. The branched chain hydrocarbyl group may contain any number of carbon atoms and will generally contain from 4 to about 20 carbon atoms. In one preferred embodiment, the branched chain hydrocarbon group contains from 5 to 20 carbon atoms and in a more preferred embodiment, contains from about 5 to about 14 carbon atoms.

In one preferred embodiment, the branched chain hydrocarbyl groups are characterized by the structures $$—C(R^{10})(R^{11})(R^{12})$$

wherein $R^{10}$, $R^{11}$ and $R^{12}$ are each independently alkyl groups, and at least one of the alkyl groups contains two or more carbon atoms. Such branched chain alkyl groups, when attached to a carboxyl group are referred to in the industry as neo groups and the acids are referred to as a neo acid. In one embodiment, $R^{10}$ and $R^{11}$ are methyl groups and $R^{12}$ is an alkyl group containing two or more carbon atoms.

Any of the above hydrocarbyl groups ($R^9$) may contain one or more carboxy groups or carboxy ester groups such as —COOR$^{15}$ wherein $R^{15}$ is a lower alkyl, hydroxy alkyl or a hydroxyalkyloxy alkyl group. Such substituted hydrocarbyl groups are present, for example, when the carboxylic acid R⁹COOH (III) is a dicarboxylic acid or a monoester of a dicarboxylic acid. Generally, however, the acid R⁹COOH is a monocarboxylic acid since polycarboxylic acids tend to form polymeric products if the reaction conditions and amounts of reactants are not carefully regulated. Mixtures of monocarboxylic acids and minor amounts of dicarboxylic acids or anhydrides are useful in preparing the esters (I).

Examples of carboxylic acids containing a straight chain lower hydrocarbyl group include formic acid, acetic acid, propionic acid, butyric acid, pentanoic acid, hexanoic acid and heptanoic acid. Examples of carboxylic acids wherein the hydrocarbyl group is a branched chain hydrocarbyl group include 2-ethyl-n-butyric acid, 2-hexyldecanoic acid, isostearic acid, 2-methyl-hexanoic acid, 3,5,5-trimethyl-hexanoic acid, 2-ethylhexanoic acid, neoheptanoic acid, neodecanoic acid, and commercial mixtures of branched chain carboxylic acids such as the mixture identified as Neo 1214 acid from Exxon.

The third type of carboxylic acids which can be utilized in the preparation of the carboxylic esters are the acids containing a straight chain hydrocarbyl group containing from 8 to about 14 carbon atoms. Examples of such higher molecular weight straight chain acids include decanoic acid, dodecanoic acid, lauric acid, stearic acid, myristic acid, behenic acid, etc. Examples of dicarboxylic acids include maleic acid, succinic acid, adipic acid, suberic acid, azelaic acid, sebacic acid, etc.

In another embodiment, the carboxylic acids utilized to prepare the esters may comprise a mixture of a major amount of monocarboxylic acids and a minor amount of dicarboxylic acids. The presence of the dicarboxylic acids results in the formation of esters of higher viscosity.

The carboxylic esters of Formula I are prepared, as mentioned above, by reacting at least one carboxylic acid with at least one polyhydroxy compound containing at least two hydroxy groups. The formation of esters by the interaction of carboxylic acids and alcohols is acid-catalyzed and is a reversible process which can be made to proceed to completion by use of a large amount of acid or by removal of the water as it is formed in the reaction. If the ester is formed by transesterification of a lower molecular weight carboxylic ester, the reaction can be forced to completion by removal of the lower molecular weight alcohol formed as a result of a transesterification reaction. The esterification reaction can be catalyzed by either organic acids or inorganic acids. Examples of inorganic acids include sulfuric acids, phosphoric acids and acidified clays. A variety of organic acids can be utilized including para-toluenesulfanic acid, acidic resins such as Amberlyst 15, etc. Organometallic catalysts include, for example, tetraisopropoxy orthotitanate.

The amounts of carboxylic acids and polyhydroxy compounds included in the reaction mixture may be varied depending on the results desired. If it is desired to esterify all of the hydroxy groups containing in the polyhydroxy compounds, sufficient carboxylic acid should be included in the mixture to react with all of the hydroxyl groups. When mixtures of the acids are reacted with a polyhydroxy compound in accordance with the present invention, the carboxylic acids can be reacted sequentially with the polyhydroxy compounds or a mixture of carboxylic acids can be prepared and the mixture reacted with the polyhydroxy compounds. In one preferred embodiment wherein mixtures of acids are utilized, the polyhydroxy compound is first reacted with one carboxylic acid, generally, the higher molecular weight branched chain or straight chain carboxylic acid followed by reaction with the straight chain lower hydrocarbyl carboxylic acid. Throughout the specification and claims, it should be understood that the esters also can be formed by reaction of the polyhydroxy compound with the anhydrides of any of the above-described carboxylic acids. For example, esters are easily prepared by reacting the polyhydroxy compounds either with acetic acid or acetic anhydride.

The formation of esters by the reaction of carboxylic acids or anhydrides with the polyhydroxy compounds described above can be effected by heating the acids or anhydrides, the polyhydroxy compounds, and an acid catalyst to an elevated temperature while removing water or low molecular weight alcohols formed in the reaction. Generally, temperatures of from about 75° C. to about 200° C. or higher are sufficient for the reaction. The reaction is completed when water or low molecular weight alcohol is no longer formed, and such completion is indicated when water or low molecular weight esters can no longer be removed by distillation.

In some instances, it is desired to prepare carboxylic esters wherein not all of the hydroxyl groups have been esterified. Such partial esters can be prepared by the techniques described above and by utilizing amounts of the acid or acids which are insufficient to esterify all of the hydroxyl groups.

The following examples illustrate the preparation of various polyol esters which are useful as supplemental lubricants (SL) in the liquid refrigerant compositions of the invention.

EXAMPLE (SL)-1

Added to a flask equipped with a stirrer, thermowell, and distillation condenser are 635 parts (2.5 moles) dipentaerythritol, 1418 parts (13.9 moles) n-valeric acid, 79 parts (0.6 moles) n-heptanoic acid and 79 parts (0.5 moles) n-nonanoic acid. The contents are heated to 160° C. and held for 6 hours. The temperature is then increased to 220° C. and held for 48 hours. Water (250 ml) was removed during this time. The contents are vacuum stripped to remove any unreacted acid. The contents are then treated with 100 ml of a 5 percent by weight aqueous sodium hydroxide solution and stirred for 3 hours at 60° C. The contents are permitted to separate into phases. Any unreacted carboxylic acid is then reacted with the sodium hydroxide solution to form a sodium salt which is soluble in the aqueous phase. This aqueous phase is then removed and the sodium hydroxide procedure is repeated. Residual water is removed at 70° C. with nitrogen blowing at 3 cubic feet per hour. The contents are filtered using diatomaceous clay and alumina to give the desired product. Analyses: % water: 0.012; %OH: 0.012; total acid number: 0.00; 40° C. viscosity: 50 cSt; 100° C. viscosity: 8.18 cSt; VI: 138.

EXAMPLE (SL)-2

Reacted together to form an ester is an acid mixture of n-valeric acid, iso-octanoic acid and iso-nonanoic acid with mono-pentaerythritol in a molar ratio of 0.8:1.2:2:1 respectively, following the procedure of Example SL-1. The 40° C. viscosity is 68 cSt.

EXAMPLE (SL)-3

Added to a flask equipped as in Example (SL)-1 are 1040 parts (10 moles) neopentylglycol and 2880 parts (20 moles)

2-ethylhexanoic acid. The contents are heated to 180° C. and held for 5 hours while removing water. The temperature is then increased to 200° C. and held for 15 hours. Water (325 ml) is removed during this time. The temperature is then increased to 220° C. and held for 2 days. At this point the neutralization number is 0.4 acid. The formed ester is transferred to a separatory funnel and extracted twice with 100 ml portions of 5 percent aqueous sodium hydroxide followed by two extractions with water. A diatomaceous earth filtering aid is added and the ester is stirred for 2 hours at room temperature. The ester is then filtered through an alumina bed. Analyses: % OH: 0.04; total acid number: 0.01; 40° C. viscosity: 7.5 cSt; 100° C. viscosity: 2.05 cSt; VI: 51.

Example (SL)-4 relates to the preparation of an ester wherein the acid is a branched chain acid at the alpha position. This example is essentially prepared as per Example (SL)-3.

EXAMPLE (SL)-4

Reacted together to form an ester are 2-ethylhexanoic acid and mono-pentaerythritol pentaerythritol in a 4:1 molar ratio respectively. The 40° C. viscosity is 46 cSt.

The Polyvinyl Ether

The polyvinyl ether supplemental lubricant is prepared by polymerizing an ether represented by the structure

wherein $R^{13}$ is hydrogen or an alkyl group containing from 1 to 4 carbon atoms and $R^{14}$ is an aliphatic group containing from 1 to 8 carbon atoms, preferably 1 to 6 carbon atoms and most preferably 2 to 4 carbon atoms.

The polyether may be symmetrical or unsymmetrical. The polyether is symmetrical when $R^{14}$ is the same in all monomer units.

Performance Additive

The composition of this invention may also includes a performance additive. The performance enhanced by these additives are in the areas of anti-wear, oxidation inhibition, rust/corrosion inhibition, extreme pressure, viscosity modification, lubricity and the like.

The performance additive comprises an alkoxylated alcohol or phenol, an alkoxylated glycol, an alkyl phenol or a phosphorus compound.

The Alkoxylated Alcohol or Phenol

The alkoxylated alcohol or phenol is of the formula

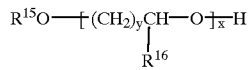

wherein $R^{15}$ is an aliphatic group containing from 1 to 20 carbon atoms or an aromatic or aliphatic substituted aromatic group containing from 6 to 24 carbon atoms, $R^{16}$ is hydrogen, methyl or ethyl, y is an integer of from 1 to 3 and x is an integer of from 2 to 50.

The alkoxylated alcohol or phenol is formed by the reaction of an alcohol or phenol with an alkylene oxide. The aliphatic group $R^{15}$ for an alcohol preferably contains from 1 to 12 carbon atoms and most preferably from 1 to 6 carbon atoms. When $R^{15}$ is an aromatic or substituted aromatic group, it contains from 6 to 18 carbon atoms and the aromatic group is a phenyl group. The substituent is an alkyl group containing from 1 to 12 carbon atoms. A most preferred substituent is an octyl group.

The alkylene oxides that react with the alcohol or phenol comprise ethylene oxide (y=1, $R^{16}$=hydrogen), propylene oxide (y=1, $R^{16}$=methyl and butylene oxide (y=1, $R^{16}$=ethyl). In order for y=2, the alkylene oxide used is 1,3-epoxypropane (y=2, $R^{16}$=hydrogen), 2-methyloxetane (y=2, $R^{16}$=methyl) or 2-ethyloxetane (y=2, $R^{16}$=ethyl) as per the following reaction:

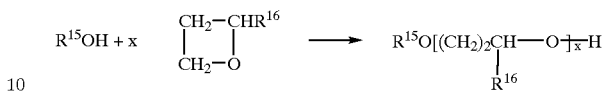

Anywhere from 2 to 50 moles of alkylene oxide per mole of alcohol or phenol is employed in the preparation of the alkoxylated alcohol or phenol, preferably from 2 to 10 and most preferably from 2 to 5. Especially preferred as the alkoxylated phenol is Triton X-45, an octylphenoxypolyethoxyethanol available from Union Carbide wherein $R^{15}$ is octyl-phenyl, y=1, $R^{16}$=hydrogen and x=4.5

The Alkoxylated Glycol

The alkoxylated glycol is of the formula

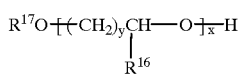

wherein $R^{17}$ is a hydroxy alkyl group wherein the alkyl group contains from 2 to 8 carbon atoms and $R^{16}$ and the subscripts x and y have the same values as taught within the alkoxylated alcohol. The alkoxylated glycol is prepared in the same manner as the alkoxylated alcohol or phenol except that the alcohol or phenol is replaced with a glycol.

The Alkyl Phenol

The alkyl phenol is of the formula

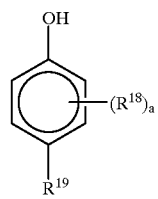

wherein $R^{18}$ is an alkyl group containing from 1 to 24 carbon atoms, $R^{19}$ is hydrogen, an alkyl group containing 1 or 2 carbon atoms or —$OR^{20}$ wherein $R^{20}$ is an alkyl group containing from 1 to 12 carbon atoms and a is an integer of from 1 to 4.

Within the alkyl phenol preferably $R^{18}$ contains from 1 to 8 carbon atoms and most preferably from 1 to 4 carbon atoms. An especially preferred $R^{18}$ is t-butyl. Preferably the subscript a is 2 or 3. When $R^{19}$ is an alkyl group it preferably is a methyl group. When $R^{19}$ is —$OR^{20}$, $R^{20}$ contains from 1 to 8 carbon atoms and most preferably from 1 to 4 carbon atoms. An especially preferred $R^{20}$ is methyl. When $R^{19}$ is an alkyl group, an especially preferred alkyl phenol is butylated hydroxytoluene (BHT) of the formula

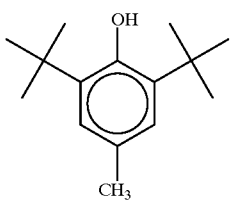

When $R^{19}$ is —$OR^{20}$, an especially preferred alkyl phenol is butylated hydroxy anisole (BHA) of the formula

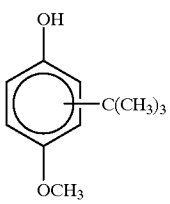

The Phosphorus Compound

The phosphorus compound is of the formula

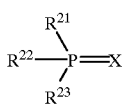

wherein $R^{21}$, $R^{22}$ and $R^{23}$ are independently hydrogen, an aliphatic or alkoxy group containing from 1 to 12 carbon atoms, or an aryl, aliphatic substituted aryl, aryloxy or aliphatic substituted aryloxy group wherein the aryl group is phenyl or naphthyl, the aryloxy group is phenoxy or naphthoxy, the aliphatic group contains from 1 to 8 carbon atoms and X is oxygen or sulfur. In one embodiment $R^{21}$, $R^{22}$ and $R^{23}$ are aliphatic substituted aryloxy groups wherein the aryloxy group is phenoxy and the aliphatic group contains from 1 to 4 carbon atoms. Most preferably the aliphatic group is methyl and X is oxygen such that the preferred phosphorus compound is tricresyl phosphate

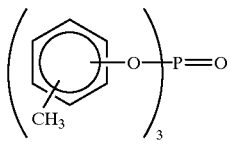

$R^{21}$, $R^{22}$ and $R^{23}$ may also be aryloxy groups wherein the aryloxy group is phenoxy and X is sulfur. A most preferred phosphorus compound here is triphenyl phosphothionate, also known as TPPT. This most preferred phosphorus compound is available from Ciba-Geigy under the name Irgalube® TPPT. The structure of TPPT is

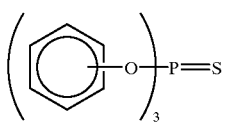

This invention is also directed to a system of using components (A) and (B). With respect to the compression refrigeration system, the invention is a compression refrigeration system, comprising a compressor, a condenser, an evaporator and an expansion valve wherein the system is charged with a composition comprising (A) carbon dioxide refrigerant, and (B) a lubricant of an aliphatic substituted naphthalene of the formula

wherein $R^1$, $R^2$, $R^3$ and $R^4$ are the same or different from each other and are each a hydrogen atom or an aliphatic group having from 1 to 20 carbon atoms, with the proviso that the total number of carbon atoms of $R^1$, $R^2$, $R^3$ and $R^4$ is within the range of 6 to 60.

Traditional hydrocarbon-based lubricants for refrigeration are immiscible with carbon dioxide. This results in oil logging or slugging, as well as loss of heat transfer in the low temperature side of the refrigeration system. The use of alkylated naphthalenes as a lubricant in carbon dioxide systems improves miscibility and thermal stability of traditional lubricants as disclosed herein.

In the following tables, TP indicates two phases of lubricant and refrigerant and NO FLOW indicates that there is no movement of the lubricant refrigerant mixture. Both TP and NO FLOW are indicative of an undesirable composition. OP indicates one phase which is desirable for the invention compositions.

Blends of selected lubricant/refrigerant pairs are prepared in sealed miscibility tubes and then subjected to temperature variations of from −60° C. to −20° C. to determine OP, TP and NO FLOW information. All listed percentages refer to % lubricant in carbon dioxide.

Tables 1 and 2 illustrate the fact that in and of themselves, alkyl benzenes and polyalphaolefins (known refrigerant lubricants for chlorofluorocarbons, hydrochlorofluorocarbons and hydrofluorocarbons), are not miscible with carbon dioxide.

TABLE 1

Miscibility of Carbon Dioxide and Alkyl Benzene

| ° C. | 6.3% | 4.5% | 2.2% | 1.1% |
|---|---|---|---|---|
| −20 | TP | TP | TP | TP |
| −25 | TP | TP | TP | TP |
| −30 | TP | TP | TP | TP |
| −35 | TP | TP | TP | TP |
| −40 | TP | TP | TP | NO FLOW |
| −45 | TP | TP | TP | NO FLOW |
| −50 | NO FLOW | NO FLOW | NO FLOW | NO FLOW |
| −55 | NO FLOW | NO FLOW | NO FLOW | NO FLOW |
| −60 | NO FLOW | NO FLOW | NO FLOW | NO FLOW |

TABLE 2

Miscibility of Carbon Dioxide and Polyalphaolefin

| ° C. | 6.0% | 4.4% | 2.1% | 1.1% |
|---|---|---|---|---|
| −20 | TP | TP | TP | TP |
| −25 | TP | TP | TP | TP |
| −30 | TP | TP | TP | TP |
| −35 | TP | TP | TP | TP |
| −40 | TP | TP | TP | TP |
| −45 | TP | TP | TP | TP |

TABLE 2-continued

Miscibility of Carbon Dioxide and Polyalphaolefin

| ° C. | 6.0% | 4.4% | 2.1% | 1.1% |
|---|---|---|---|---|
| -50 | NO FLOW | NO FLOW | NO FLOW | NO FLOW |
| -55 | NO FLOW | NO FLOW | NO FLOW | NO FLOW |
| -60 | NO FLOW | NO FLOW | NO FLOW | NO FLOW |

As shown in Table 3, an aliphatic-substituted naphthalene as the sole lubricant exhibits miscibility with carbon dioxide.

TABLE 3

Miscibility of Carbon Dioxide and MCP-917

| ° C. | 5% | 3% | 1% |
|---|---|---|---|
| -20 | TP | OP | OP |
| -25 | TP | OP | OP |
| -30 | TP | OP | OP |
| -35 | TP | OP | OP |
| -40 | TP | TP | TP |
| -45 | TP | TP | NO FLOW |
| -50 | NO FLOW | NO FLOW | NO FLOW |
| -55 | NO FLOW | NO FLOW | NO FLOW |
| -60 | NO FLOW | NO FLOW | NO FLOW |

Table 4 shows the miscibility of a blend of an aliphatic-substituted naphthalene and an alkyl benzene.

TABLE 4

Miscibility of Carbon Dioxide with a 50/50 Blend of MCP-917 and an Alkyl Benzene

| ° C. | 5% | 3% | 1% |
|---|---|---|---|
| -20 | TP | TP | OP |
| -25 | TP | TP | OP |
| -30 | TP | TP | OP |
| -35 | TP | TP | OP |
| -40 | TP | TP | OP |
| -45 | TP/SLOW | TP | NO FLOW |
| -50 | TP/V.SLOW | NO FLOW | NO FLOW |
| -55 | NO FLOW | NO FLOW | NO FLOW |
| -60 | NO FLOW | NO FLOW | NO FLOW |

Polyol esters and polyalkylene glycols both exhibit a high affinity for water. As such, residual moisture results in lubricant decomposition or the formation of acids. Aliphatic-substituted naphthalene on the other hand is hydrolytically stable and has a low affinity for moisture. This reduces the potential for moisture in the system. This allows for aliphatic-substituted naphthalene to be combined with polyol esters and polyalkylene glycols to improve their hydrolytic stability while maintaining the desired miscibility as shown in Tables 5 and 6.

TABLE 5

Miscibility of Carbon Dioxide with a 50/50 Blend of MCP-917 and a Polyol Ester

| ° C. | 5% | 3% | 1% |
|---|---|---|---|
| -20 | TP | TP | OP |
| -25 | TP | TP | OP |
| -30 | TP | TP | OP |
| -35 | TP | TP | OP |
| -40 | TP | TP | TP |

TABLE 5-continued

Miscibility of Carbon Dioxide with a 50/50 Blend of MCP-917 and a Polyol Ester

| ° C. | 5% | 3% | 1% |
|---|---|---|---|
| -45 | NO FLOW | TP | NO FLOW |
| -50 | NO FLOW | NO FLOW | NO FLOW |
| -55 | NO FLOW | NO FLOW | NO FLOW |
| -60 | NO FLOW | NO FLOW | NO FLOW |

TABLE 6

Miscibility of Carbon Dioxide with a Blend of MCP-917 and a Polyalkylene Glycol

| ° C. | 5% | 3% | 1% |
|---|---|---|---|
| -20 | TP | TP | OP |
| -25 | TP | TP | OP |
| -30 | TP | TP | OP |
| -35 | TP | TP | OP |
| -40 | TP | TP | OP |
| -45 | NO FLOW | NO FLOW | NO FLOW |
| -50 | NO FLOW | NO FLOW | NO FLOW |
| -55 | NO FLOW | NO FLOW | NO FLOW |
| -60 | NO FLOW | NO FLOW | NO FLOW |

While the invention has been explained in relation to its preferred embodiments, it is to be understood that various modifications thereof will become apparent to those skilled in the art upon reading the disclosure. Therefore, it is to be understood that the invention disclosed herein is intended to cover such modifications as fall within the scope of the appended claims.

What is claimed is:

1. A lubricant-refrigerant composition contained within a compression refrigeration system, comprising (A) carbon dioxide refrigerant, and
(B) a lubricant of an aliphatic substituted naphthalene.

2. The composition of claim 1 wherein a supplemental lubricant is present comprising at least one of an alkyl benzene wherein the alkyl groups contain from 8 to 40 carbon atoms, a straight chain or branched chain hydrocarbon wherein the hydrocarbon contains from 10 to 80 carbon atoms, a polyalkylene glycol of the formula

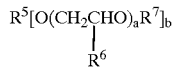

wherein $R^5$ is a aliphatic hydrocarbon group containing from 1 to 30 carbon atoms, or an alkyl substituted aromatic wherein the alkyl group contains from 1 to 20 carbon atoms, $R^6$ is independently hydrogen, methyl or ethyl, $R^7$ is hydrogen or a hydrocarbon group containing from 1 to 20 carbon atoms or an acyl group containing from 2 to 20 carbon atoms, b is an integer of from 1 to 10 and a is an integer such that the product of a and b is at least two, a polyol ester wherein the ester is an organic ester that is the reaction product of a carboxylic acid and a polyhydroxy compound wherein the ester is characterized by the general formula

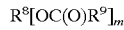

wherein $R^8$ is a hydrocarbyl group; each $R^9$ is independently: (i) hydrogen, (ii) a straight chain hydrocarbyl group having from 1 to about 7 carbon atoms, (iii) branched chain hydrocarbyl group having from 4 to about 20 carbon atoms, or (iv) a straight chain hydrocarbyl group having from 8 to about 14 carbon atoms, provided that when at least one $R^9$ is (iv), at least one other $R^9$ is either (i) or (ii); m is at least 2, or a polyvinyl ether prepared by polymerizing an ether of the structure

wherein $R^{13}$ is hydrogen or an alkyl group containing from 1 to 4 carbon atoms and $R^{14}$ is an aliphatic group containing from 1 to 8 carbon atoms.

3. The composition of claim 1 further comprising a performance additive comprising an alkoxylated alcohol or phenol of the formula

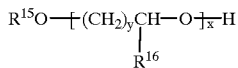

wherein $R^{15}$ is an aliphatic group containing from 1 to 20 carbon atoms or an aromatic or aliphatic substituted aromatic group containing from 6 to 24 carbon atoms, $R^{16}$ is hydrogen, methyl or ethyl, y is an integer of from 1 to 3 and x is an integer of from 2 to 50;

an alkoxylated glycol of the formula

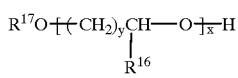

wherein $R^{17}$ is a hydroxy alkyl group wherein the alkyl group contains from 2 to 8 carbon atoms and $R^{16}$ is hydrogen, methyl or ethyl, y is an integer of from 1 to 3 and x is an integer of from 2 to 50;

an alkyl phenol of the formula

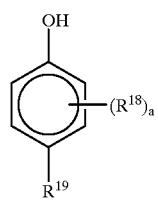

wherein $R^{18}$ is an alkyl group containing from 1 to 24 carbon atoms, $R^{19}$ is hydrogen, an alkyl group containing 1 or 2 carbon atoms or $-OR^6$ wherein $R^6$ is an alkyl group containing from 1 to 12 carbon atoms and a is an integer of from 1 to 4; or a phosphorus compound of the formula

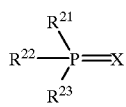

wherein $R^{21}$, $R^{22}$ and $R^{23}$ are independently hydrogen, an aliphatic or alkoxy group containing from 1 to 12 carbon atoms, or an aryl, aliphatic substituted aryl, aryloxy or aliphatic substituted aryloxy group wherein the aryl group is phenyl or naphthyl, the aryloxy group is phenoxy or naphtoxy, the aliphatic group contains from 1 to 8 carbon atoms and X is oxygen or sulfur.

4. The composition of claim 2 further comprising a performance additive comprising an alkoxylated alcohol or phenol of the formula

wherein $R^{15}$ is an aliphatic group containing from 1 to 20 carbon atoms or an aromatic or aliphatic substituted aromatic group containing from 6 to 24 carbon atoms, $R^{16}$ is hydrogen, methyl or ethyl, y is an integer of from 1 to 3 and x is an integer of from 2 to 50;

an alkoxylated glycol of the formula

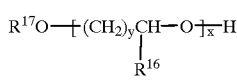

wherein $R^{17}$ is a hydroxy alkyl group wherein the alkyl group contains from 2 to 8 carbon atoms and $R^{16}$ is hydrogen, methyl or ethyl, y is an integer of from 1 to 3 and x is an integer of from 2 to 50;

an alkyl phenol of the formula

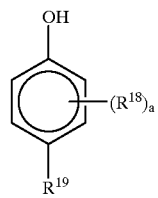

wherein $R^{18}$ is an alkyl group containing from 1 to 24 carbon atoms, $R^{19}$ is hydrogen, an alkyl group containing 1 or 2 carbon atoms or $-OR^6$ wherein $R^6$ is an alkyl group containing from 1 to 12 carbon atoms and a is an integer of from 1 to 4; or a phosphorus compound of the formula

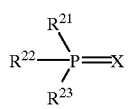

wherein $R^{21}$, $R^{22}$ and $R^{23}$ are independently hydrogen, an aliphatic or alkoxy group containing from 1 to 12 carbon atoms, or an aryl, aliphatic substituted aryl, aryloxy or aliphatic substituted aryloxy group wherein the aryl group is phenyl or naphthyl, the aryloxy group is phenoxy or naphthoxy, the aliphatic group contains from 1 to 8 carbon atoms and X is oxygen or sulfur.

5. The composition of claim 1 wherein the lubricant has a viscosity of 10–460 cSt at 40° C.

6. The composition of claim 1 wherein the aliphatic substituted naphthalene is of the formula

wherein $R^1$, $R^2$, $R^3$ and $R^4$ are the same or different from each other and are each a hydrogen atom or an aliphatic group having from 1 to 20 carbon atoms, with the proviso that the total number of carbon atoms of $R^1$, $R^2$, $R^3$ and $R^4$ is within the range of 6 to 60.

7. The composition of claim 2 wherein the alkyl groups of the alkyl benzene contain a total of from 12 to 36 carbon atoms.

8. The composition of claim 2 wherein the weight ratio of aliphatic substituted naphthalene to the supplemental lubricant is (1–99):(99–1).

9. The composition of claim 2 wherein the ratio of aliphatic substituted naphthalene to the supplemental lubricant is (10–90):(90–10).

10. The composition of claim 2 wherein the hydrocarbon contains from 16 to 70 carbon atoms.

11. The composition of claim 2 wherein within the polyalkylene glycol, $R^5$ is an alcohol residue containing up to 12 carbon atoms.

12. The composition of claim 2 wherein within the polyalkylene glycol, $R^5$ is a phenol residue present as an alkyl substituted aromatic wherein the alkyl group contains from 1 to 12 carbon atoms.

13. The composition of claim 2 wherein within the polyalkylene glycol, $R^7$ is hydrogen.

14. The composition of claim 2 wherein within the polyalkylene glycol, $R^7$ is an aliphatic group containing from 1 to 4 carbon atoms.

15. The composition of claim 2 wherein within the polyalkylene glycol, $R^7$ is an aliphatic group containing from 8 to 10 carbon atoms.

16. The composition of claim 2 wherein within the polyalkylene glycol, $R^7$ is an acyl group containing up to 10 carbon atoms.

17. The composition of claim 11 wherein the alcohol of the alcohol residue is a mono alcohol.

18. The composition of claim 17 wherein the alcohol contains from 1 to 6 carbon atoms and a is at least 4.

19. The composition of claim 11 wherein the alcohol of the alcohol residue is a poly alcohol.

20. The composition of claim 19 wherein the poly alcohol is a diol or triol containing from 2 to 6 carbon atoms.

21. The composition of claim 20 wherein the diol is ethylene glycol.

22. The composition of claim 20 wherein a is at least 4.

23. The composition of claim 2 wherein m is an integer of from 2 to 10.

24. The composition of claim 2 wherein said polyhydroxy compound which forms the polyol ester comprises ethylene glycol, diethylene glycol, triethylene glycol, propylene glycol, dipropylene glycol, glycerol, neopentyl glycol, 1,2-butanediol, 1,3-butanediol, 1,4-butanediol, pentaerythritol, dipentaerythritol, tripentaerythritol, triglycerol, trimethylolpropane, sorbitol, hexaglycerol, 2,2,4-trimethyl-1,3-pentanediol, or mixtures thereof.

25. The composition of claim 2 wherein at least one $R^{19}$ is a straight chain hydrocarbyl group having from 1 to about 7 carbon atoms.

26. The composition of claim 25 wherein said carboxylic acid which forms the polyol ester comprises acetic acid, propionic acid, butyric acid, pentanoic acid, hexanoic acid, heptanoic acid, octanoic acid or decanoic acid.

27. The composition of claim 2 wherein at least one $R^9$ is a branched chain hydrocarbyl group having from 4 to about 20 carbon atoms.

28. The composition of claim 27 wherein said carboxylic acid which forms the polyol ester comprises 2-ethyl-n-butanoic acid, 2-ethylhexanoic acid, neoheptanoic acid, neodecanoic acid, 3,5,5-trimethylhexanoic acid or mixtures thereof.

29. The composition of claim 27 wherein the branched chain hydrocarbyl group is characterized by the structure

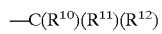

wherein $R^{10}$, $R^{11}$ and $R^{12}$ are each independently alkyl groups and at least one of the alkyl groups contains 2 or more carbon atoms.

30. The composition of claim 2 wherein $R^9$ is a mixture of a straight chain hydrocarbyl group having from 1 to 7 carbon atoms with a straight chain hydrocarbyl group having from 8 to about 14 carbon atoms.

31. The composition of claim 30 wherein said carboxylic acid which forms the polyol ester is a mixture of at least one carboxylic acid comprising acetic acid, propionic acid, butyric acid, pentanoic acid, hexanoic acid or heptanoic acid with at least one acid comprising decanoic acid, dodecanoic acid or lauric acid.

32. The composition of claim 2 wherein $R^9$ is a mixture of a branched chain hydrocarbyl group having from 4 to about 20 carbon atoms with a straight chain hydrocarbyl group having from 8 to about 14 carbon atoms.

33. The composition of claim 2 wherein said carboxylic acid which forms the polyol ester is a mixture of at least one carboxylic acid comprising 2-ethyl-n-butyric acid, 2-hexyldecanoic acid, isostearic acid, 2-methylhexanoic acid, 3,5,5-trimethylhexanoic acid, 2-ethylhexanoic acid, neoheptanoic acid, or neodecanoic acid, with at least one acid comprising decanoic acid, stearic acid, lauric acid or behind acid.

34. The composition of claim 2 wherein said polyhydroxy compound which forms the polyol ester comprises neopentyl glycol, trimethylolpropane, pentaerythritol or dipentaerythritol and said carboxylic acid is 2-ethylhexanoic acid.

35. The composition of claim 2 wherein said carboxylic acid which forms the polyol ester is a monocarboxylic acid.

36. The composition of claim 2 wherein said carboxylic acid which forms the polyol ester is a polycarboxylic acid.

37. The composition of claim 36 wherein said polycarboxylic acid which forms the polyol ester is a dicarboxylic acid.

38. The composition of claim 2 wherein said carboxylic acid which forms the polyol ester comprises at least one monocarboxylic acid and at least one polycarboxylic acid.

39. The composition of claim 38 wherein said carboxylic acid which forms the polyol ester comprises greater than 50% by weight of monocarboxylic acid.

40. The composition of claim 38 wherein said polycarboxylic acid which forms the polyol ester is a dicarboxylic acid.

41. The composition of claim 40 wherein said dicarboxylic acid which forms the polyol ester comprises maleic acid, succinic acid, adipic acid or phthalic acid.

42. The composition of claim 2 wherein said carboxylic acid which forms the polyol ester comprises formic acid, propionic acid, butyric acid, pentanoic acid, hexanoic acid or heptanoic acid.

43. The composition of claim 2 wherein said carboxylic acid which forms the polyol ester comprises 2-ethyl-n-butyric acid, 2-hexyldecanoic acid, isostearic acid, 2-methylhexanoic acid, 3,5,5-trimethylhexanoic acid, 2-ethylhexanoic acid, neoheptanoic acid neodecanoic acid or mixtures thereof.

44. The composition of claim 2 wherein said carboxylic acid which forms the polyol ester comprises decanoic acid, dodecanoic acid, stearic acid, lauric acid, behenic acid or mixtures thereof.

45. The composition of claim 2 wherein within the polyvinyl ether, $R^{14}$ contains from 1 to 6 carbon atoms.

46. The composition of claim 2 wherein within the polyvinyl ether, $R^{14}$ contains from 2 to 4 carbon atoms.

47. The composition of claim 6 wherein $R^1$, $R^2$, $R^3$ and $R^4$ are alkyl groups such that the total number of carbon atoms of $R^1$, $R^2$, $R^3$ and $R^4$ is within the range of 15 to 50.

48. The composition of claim 47 wherein the total number of carbon atoms of $R^1$, $R^2$, $R^3$ and $R^4$ is not more than 30.

49. The composition of claim 1 wherein the refrigeration system comprises a compressor, a condenser, an evaporator and an expansion valve.

50. A compression refrigeration system, comprising;

a compressor, a condenser, an evaporator and an expansion valve wherein the system is charged with a composition comprising (A) carbon dioxide refrigerant, and
(B) a lubricant of an aliphatic-substituted naphthalene of the formula

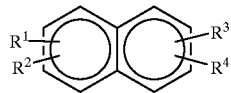

wherein $R^1$, $R^2$, $R^3$ and $R^4$ are the same or different from each other and are each a hydrogen atom or an aliphatic group having from 1 to 20 carbon atoms, with the proviso that the total number of carbon atoms of $R^1$, $R^2$, $R^3$ and $R^4$ is within the range of 6 to 60.

* * * * *